United States Patent
Kong et al.

(10) Patent No.: US 10,809,848 B2
(45) Date of Patent: Oct. 20, 2020

(54) TOUCH-CONTROL DISPLAY PANEL, DRIVING METHOD AND TOUCH-CONTROL DISPLAY DEVICE

(71) Applicant: Shanghai Tianma Micro-electronics Co., Ltd., Shanghai (CN)

(72) Inventors: Xiangjian Kong, Shanghai (CN); Feng Qin, Shanghai (CN); Jine Liu, Shanghai (CN); Lei Wang, Shanghai (CN); Chunmei Gao, Shanghai (CN); Qiongqin Mao, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 107 days.

(21) Appl. No.: 16/166,447

(22) Filed: Oct. 22, 2018

(65) Prior Publication Data
US 2019/0332219 A1    Oct. 31, 2019

(30) Foreign Application Priority Data
Apr. 28, 2018   (CN) .......................... 2018 1 0402870

(51) Int. Cl.
G06F 3/041 (2006.01)
G06F 3/044 (2006.01)
G06F 3/047 (2006.01)

(52) U.S. Cl.
CPC ............ G06F 3/0416 (2013.01); G06F 3/044 (2013.01); G06F 3/047 (2013.01); G06F 3/0412 (2013.01)

(58) Field of Classification Search
CPC ....... G06F 3/0416; G06F 3/0412; G06F 3/044
See application file for complete search history.

(56) References Cited

U.S. PATENT DOCUMENTS

| | | | | |
|---|---|---|---|---|
| 2013/0321382 A1* | 12/2013 | Nagao | ................. | G09G 3/3696 345/212 |
| 2014/0028616 A1* | 1/2014 | Furutani | ............. | G09G 3/3607 345/174 |

(Continued)

FOREIGN PATENT DOCUMENTS

| CN | 103309070 A | 9/2013 |
|---|---|---|
| CN | 104216578 A | 12/2014 |

*Primary Examiner* — Priyank J Shah
(74) *Attorney, Agent, or Firm* — Anova Law Group PLLC

(57) ABSTRACT

A touch-control display panel, driving method, and a touch-control display device are provided. The touch-control display panel includes: a display area including a plurality of pixels; a non-display area; a first substrate; and a second substrate opposing the first substrate. A portion of the first substrate in the first region includes a pixel electrode layer and a first electrode layer. The first electrode layer is located on a side of the pixel electrode layer away from the second substrate and includes a plurality of first electrodes. The pixel electrode layer includes a plurality of pixel electrodes. A touch-control electrode layer is located on a side of the second substrate toward the first substrate and includes a plurality of touch-control electrodes. Along a direction perpendicular to the touch-control display panel, each touch-control electrode of the plurality of the touch-control electrodes overlaps with and connects with one or more first electrode of the plurality of the first electrodes.

20 Claims, 16 Drawing Sheets

(56) References Cited

U.S. PATENT DOCUMENTS

| | | | |
|---|---|---|---|
| 2014/0055685 A1* | 2/2014 | Wang | G06F 3/044 349/12 |
| 2014/0125626 A1* | 5/2014 | Yang | G06F 3/0412 345/174 |
| 2014/0306916 A1* | 10/2014 | Wang | G06F 3/0412 345/173 |
| 2015/0029413 A1* | 1/2015 | Chang | G06F 3/0412 349/12 |
| 2015/0220204 A1* | 8/2015 | Noguchi | G06F 3/044 345/174 |
| 2016/0026290 A1* | 1/2016 | Liu | G06F 3/0412 345/174 |
| 2017/0102821 A1* | 4/2017 | Lai | G06F 3/0416 |
| 2017/0115812 A1* | 4/2017 | Lin | G02F 1/13338 |
| 2017/0185208 A1* | 6/2017 | Liu | G06F 3/044 |
| 2017/0228086 A1* | 8/2017 | Lee | G06F 3/0416 |
| 2017/0235414 A1* | 8/2017 | Ding | G02F 1/136286 345/174 |
| 2018/0067374 A1* | 3/2018 | Xi | G02F 1/13338 |
| 2018/0173350 A1* | 6/2018 | Cao | G06F 3/044 |
| 2019/0179484 A1* | 6/2019 | Jang | G06F 3/0418 |
| 2019/0339557 A1* | 11/2019 | Tominaga | G02F 1/1343 |
| 2020/0033972 A1* | 1/2020 | Huang | H01L 23/49838 |

\* cited by examiner

TOUCH-CONTROL DISPLAY PANEL, DRIVING METHOD AND TOUCH-CONTROL DISPLAY DEVICE

CROSS-REFERENCES TO RELATED APPLICATION

This application claims the priority of Chinese Patent Application No. 201810402870.X, filed on Apr. 28, 2018, the content of which is incorporated herein by reference in its entirety.

TECHNICAL FIELD

The present disclosure generally relates to the field of touch-control display technology and, more particularly, relates to a touch-control display panel, driving method, and a touch-control display device.

BACKGROUND

For a touch-control display panel in a vertical electric field display mode, as shown in FIG. 1, a display panel includes an array substrate 01 and a color film substrate 06. The array substrate 01 includes a first substrate 08, a memory electrode layer 03, an array of thin film transistors 02 and a pixel electrode layer 04. The color film substrate 06 includes a common electrode layer 05, a second substrate 09 and a touch-control electrode layer 07. The memory electrode layer 03 and the common electrode layer 05 are made of a metal oxide layer which is transparent in the whole surface such as indium-tin-oxide (ITO). A transmission rate of the color film substrate 06 is about 94% when the color film substrate 06 is only covered by the touch-control electrode layer 07, and the transmission rate is about 95% when the color film substrate 06 is only covered by the common electrode layer 05. The transmission rate of the color film substrate 06 reduces to about 81% when it is covered by the touch-control electrode layer 07 and the common electrode layer 05. Correspondingly, display performance of the touch-control display panel and the transmission rate of the touch-control display panel decreases. Also, manufacturing cost of the touch-control display panel increases because additional circuits are required to control the touch-control electrode layer 07. Further, touch-control wires 071 have to be deployed on one side of the color film substrate 06 away from the array substrate 01. The touch-control wires 071 are connected to touch-control electrodes in the touch-control electrode layer 07 and transmit electrical signals to the touch-control electrodes. Loads between the touch-control wires 071 and the common electrode layer 05 are large because the touch-control wires 071 are close to the common electrode layer 05. Correspondingly, the signals in the touch-control wires 071 are easy to be interfered and the display performance is reduced.

The disclosed touch-control display panel, driving method, and display device are directed to solve one or more problems set forth above and other problems.

SUMMARY

One aspect of the present disclosure provides a touch-control display panel. The touch-control display panel comprises: a display area including a plurality of pixels; a non-display area; a first substrate and a second substrate opposing the first substrate. A portion of the first substrate in the first region includes a pixel electrode layer and a first electrode layer. The first electrode layer is located on a side of the pixel electrode layer away from the second substrate and includes a plurality of first electrodes. The pixel electrode layer includes a plurality of pixel electrodes. A touch-control electrode layer is located on a side of the second substrate toward the first substrate and includes a plurality of touch-control electrodes. Along a direction perpendicular to the touch-control display panel, each touch-control electrode of the plurality of the touch-control electrode overlaps with and connects with one or more first electrode of the plurality of the first electrodes.

Another aspect of the present disclosure provides a touch-control display device. The touch-control display device includes: a touch-control display panel, including a display area including a plurality of pixels; a non-display area; a first substrate and a second substrate opposing the first substrate. A portion of the first substrate in the first region includes a pixel electrode layer and a first electrode layer. The first electrode layer is located on a side of the pixel electrode layer away from the second substrate and includes a plurality of first electrodes. The pixel electrode layer includes a plurality of pixel electrodes. A touch-control electrode layer is located on a side of the second substrate toward the first substrate and includes a plurality of touch-control electrodes. Along a direction perpendicular to the touch-control display panel, each touch-control electrode of the plurality of the touch-control electrode overlaps with and connects with one or more first electrode of the plurality of the first electrodes.

Another aspect of the present disclosure provides a driving method for the touch-control display panel. The driving method includes: providing a touch-control display panel including a display area including a plurality of pixels; a non-display area; a first substrate and a second substrate, configured opposing each other; a portion of the first substrate in the first region includes a pixel electrode layer and a first electrode layer; the first electrode layer is located on a side of the pixel electrode layer away from the second substrate and includes a plurality of first electrodes; the pixel electrode layer includes a plurality of pixel electrodes; a touch-control electrode layer is located on a side of the second substrate toward the first substrate and includes a plurality of touch-control electrodes; along a direction perpendicular to the touch-control display panel, each touch-control electrode of the plurality of the touch-control electrode overlaps with and connects with one or more first electrode of the plurality of the first electrodes; in a display stage of the touch-control display panel, applying a common voltage signal to the touch-control electrode of the plurality of the touch control electrodes and the first electrode of the plurality of the first electrodes that is electrically connected to the corresponding touch-control electrode of the plurality of the touch-control electrodes, and applying a data signal to the pixel electrode; and in a touch-control stage of the touch-control display panel, applying a touch-control signal to the touch-control electrode of the plurality of the touch control electrodes and the first electrode of the plurality of the first electrodes that is electrically connected to the corresponding touch-control electrode of the plurality of the touch-control electrodes.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
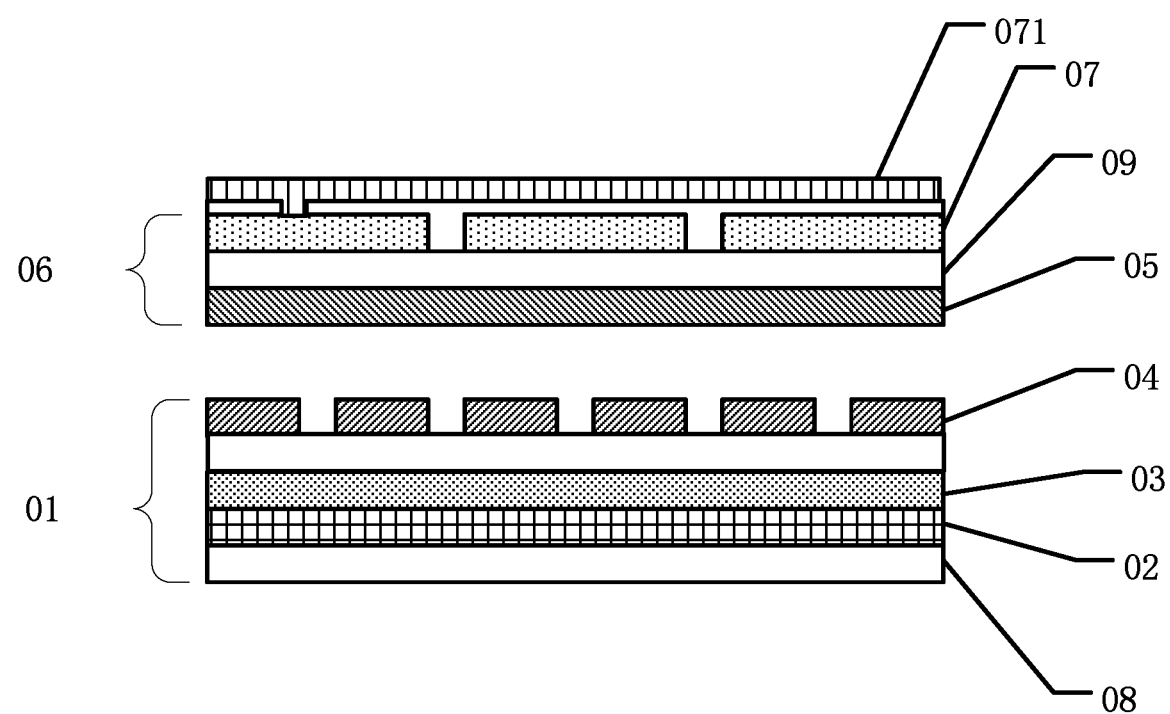
FIG. 1 illustrates a cross-sectional view of a touch-control display panel.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the invention. Furthermore, a three-dimensional (3D) size including length, width and depth should be considered during practical fabrication.

Referring to FIG. 1, for a touch-control display panel in a vertical electric field display mode, a touch-control electrode layer 07 may be deployed on a side of a color film substrate 06 away from an array substrate 01, and a thickness of the touch-control display panel may increase correspondingly. When the touch-control electrode layer 07 is deployed on a side of the color film substrate 06 close to the array substrate 01, a touch-control performance of the touch-control display panel may be reduced. The color film substrate 06 may have a thickness of about 150 μm to about 200 μm, and a liquid crystal layer may have a thickness of about 2 μm to about 4 μm. Correspondingly, a distance between the touch-control electrode layer 07 and the memory electrode layer 03 may be about 150 μm to about 204 μm. When the touch-control electrode layer 07 is deployed on a side of the color film substrate 06 close to the array substrate 01, the distance between the touch-control electrode layer 07 and the memory electrode layer 03 may be decreased significantly and become close to the thickness of the liquid crystal layer. A coupling capacitance between the touch-control electrode layer 07 and the memory electrode layer 03 may increase and interfere with touch-control signals. Correspondingly, an accuracy of the touch-control signals and a touch-control performance may be reduced.

Figure 2:
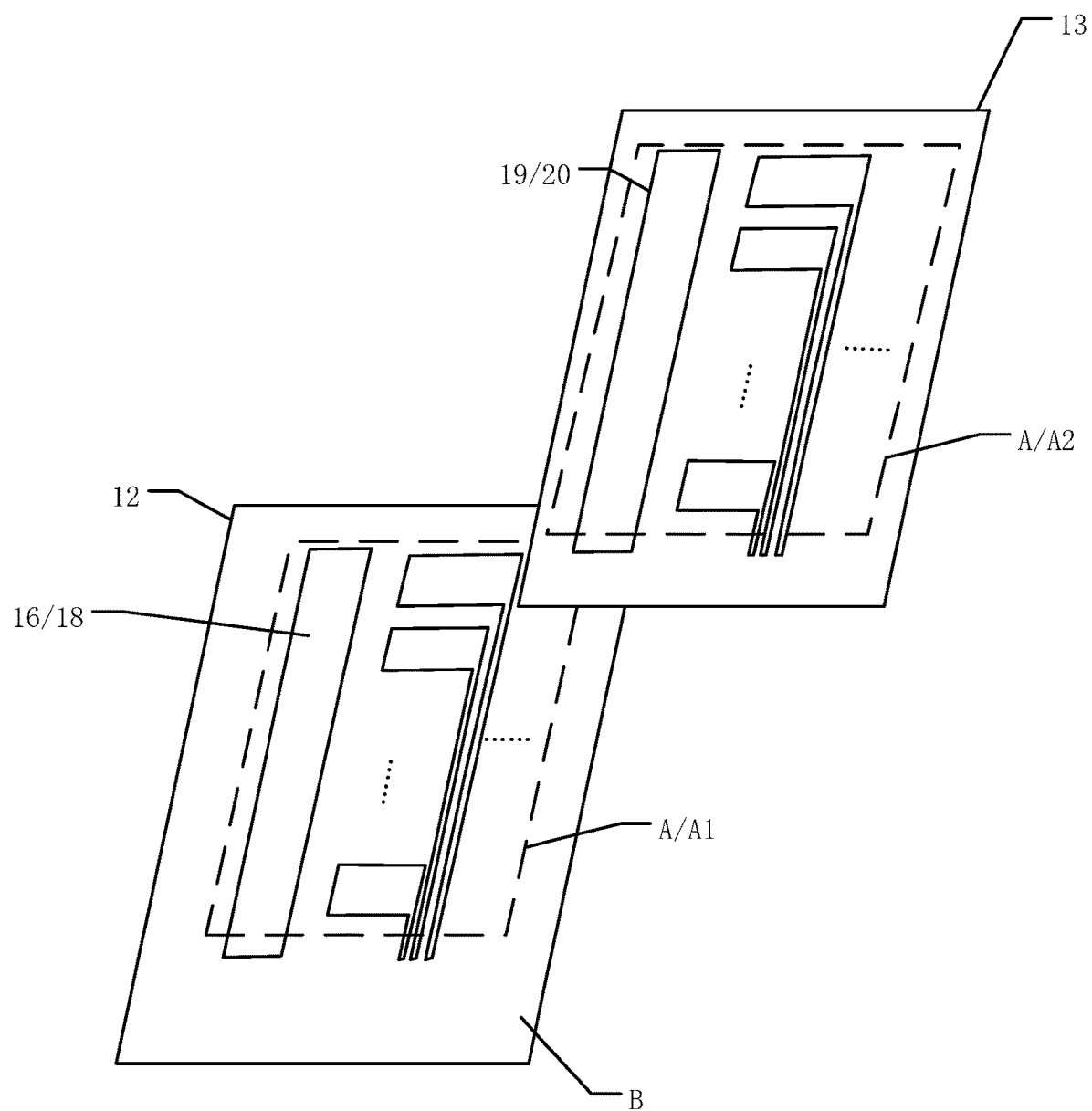
FIG. 2 illustrates a structure of an exemplary touch-control display panel consistent with various disclosed embodiments in the present disclosure.
Figure 3:
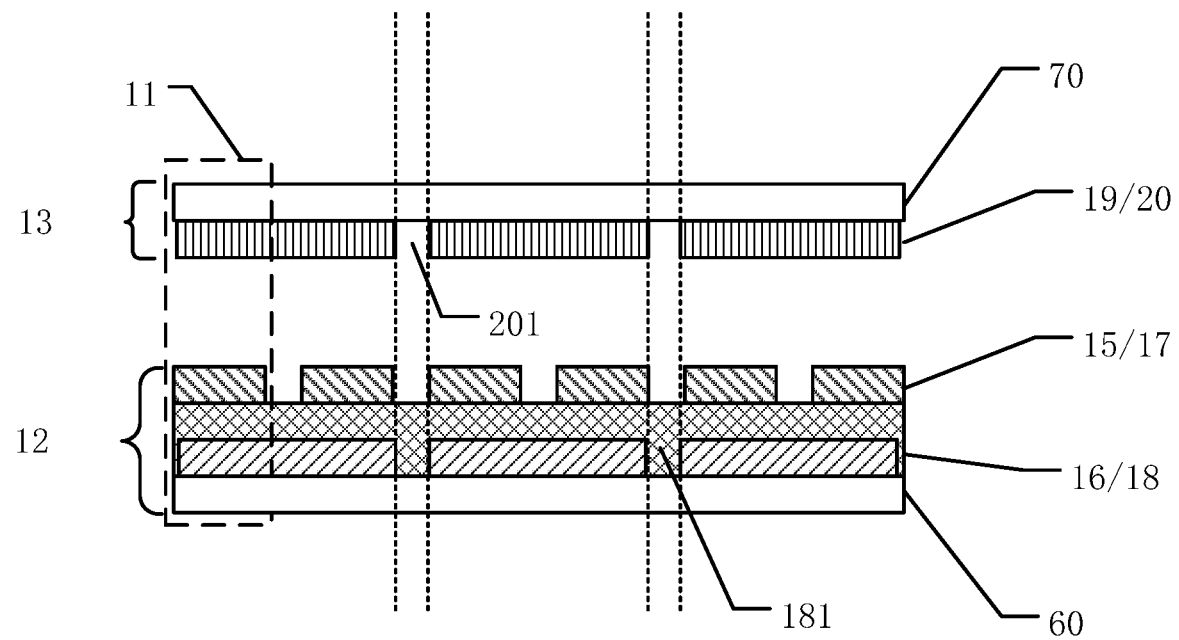
FIG. 3 illustrates a cross-sectional view of the touch-control display panel in FIG. 2 consistent with various disclosed embodiments in the present disclosure.

As illustrated in FIGS. 2-3, the present disclosure provides a display panel. FIG. 2 illustrates a splitting structure of a touch-control display panel 10 consistent with disclosed embodiments and FIG. 3 illustrates a cross-sectional view of the touch-control display panel 10 in FIG. 2. The touch-control display panel 10 may include a display area A and a non-display area B. The display area A may include a plurality of pixels 11, a first substrate 12 and a second substrate 13 opposing the first substrate 12. A portion of the first substrate 12 in the display area A1 may include a pixel electrode layer 15 and a first electrode layer 16. The first electrode layer 16 may be deployed on a side of the pixel electrode layer 15 away from the second substrate 13. The pixel electrode layer 15 may include a plurality of pixel electrodes 17, and the first electrode layer 16 may include a plurality of first electrodes 18. A side of the display area A2 of the second substrate 13 toward the first substrate 13 may include a touch-control electrode layer 19. The touch-control electrode layer 19 may include a plurality of touch-control electrodes 20. In various embodiments, one touch-control electrode 20 of the plurality of the touch-control electrodes may overlap and electrically connect with one or more first electrodes 18 of the plurality of the first electrodes. In some cases, one first electrode 18 of the plurality of the first electrodes may overlap with only one touch-control electrode 20 of the plurality of the touch-electrodes 20 along a direction perpendicular to the touch-control display panel 10. Each first electrode 18 may be electrically connected to one touch-control electrode 20 overlapped therewith.

The first substrate 12 may further include a first glass substrate 60 and the second substrate 13 may further include a second glass substrate 70.

The shape of the first electrodes 18 and the touch-control electrodes 20 illustrated in FIG. 2 is for example only, and there is no limitation on the shape of the first electrodes 18 and the touch-control electrodes 20. The first electrodes 18 and the touch-control electrodes 20 may have any other suitable shapes. FIG. 2 illustrates a splitting structure of the touch-control display panel, and the first substrate and the second substrate may be assembled to form the touch-control display panel shown in FIG. 3. The pixel electrode layer 15 may include a plurality of pixel electrodes arranged in an array and the display area A1 in the first substrate 12 may further include thin film transistors corresponding to the pixel electrodes.

The touch-control electrode may have a self-capacitance mode or an inter-capacitance mode, in the touch-control display panel provided by various embodiments of the present disclosure. For description purposes, FIG. 2 illustrates the touch-control display panel with the touch-control electrodes in the self-capacitance mode.

Figure 4:
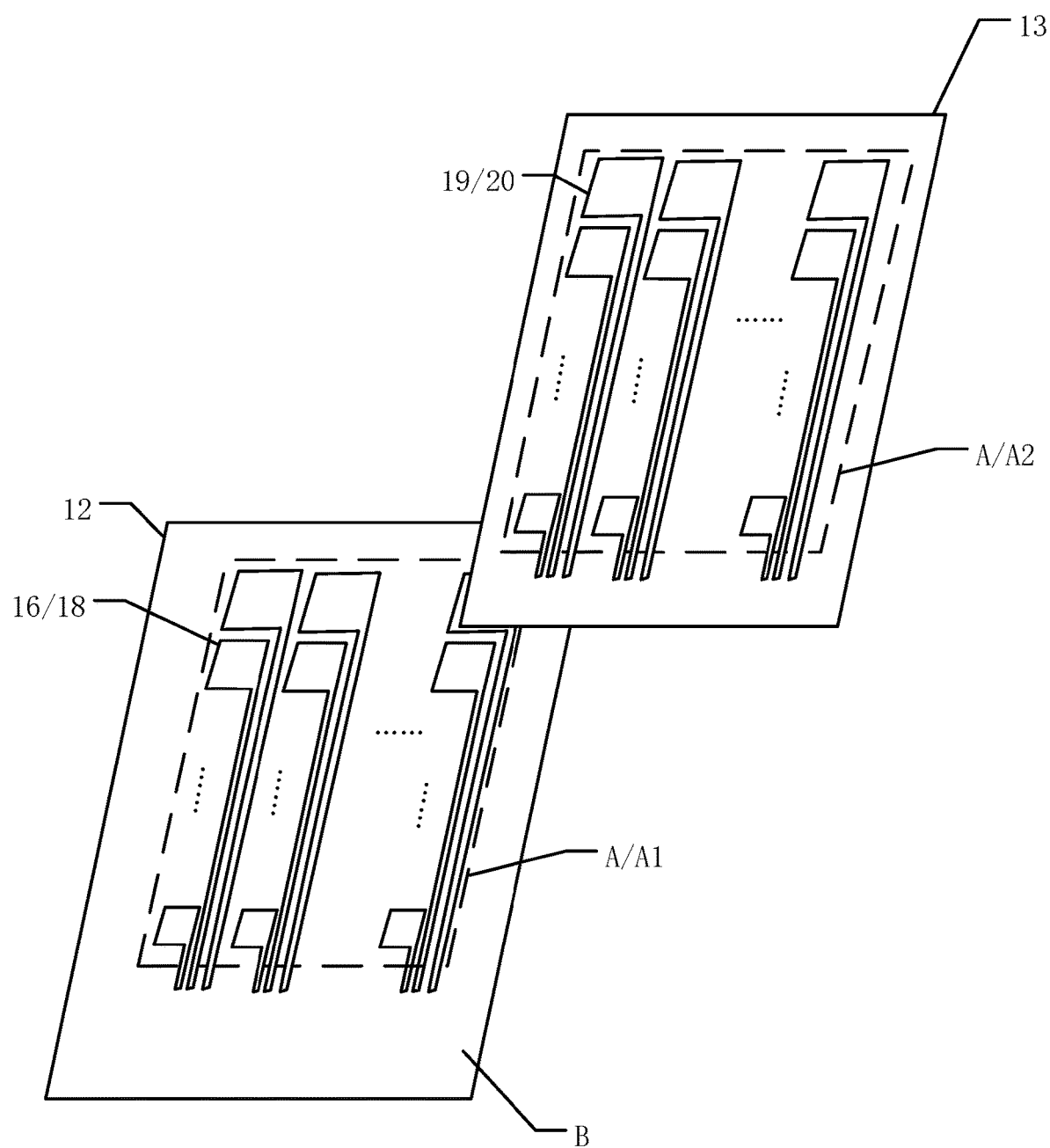
FIG. 4 illustrates a structure of another exemplary touch-control display panel consistent with various disclosed embodiments in the present disclosure.

FIG. 4 illustrates a splitting structure of another touch-control display panel consistent with disclosed embodiments. In FIG. 4, an arrangement of the touch-control electrodes with the self-capacitance mode is illustrated. Different from FIG. 2, the touch-control electrodes 20 in FIG. 4 may have a balloon shape and may be arranged in a matrix. Correspondingly, the first electrodes 18 in FIG. 4 may have a balloon shape and may be arranged in a matrix. Each touch-control electrode 20 may independently monitor touch-control information when it receives an appropriate touch-control signal. Each touch-control electrode 20 may realize transmission and reception of signals, to form an independent touch-control unit.

The shape and arrangement of the touch-control electrodes and the first electrodes in FIG. 2 and FIG. 4 are for example only, and there is no limitation on the shape and arrangement of the touch-control electrodes and the first electrodes. The touch-control electrodes may use any other suitable shapes and arrangements.

Figure 5:
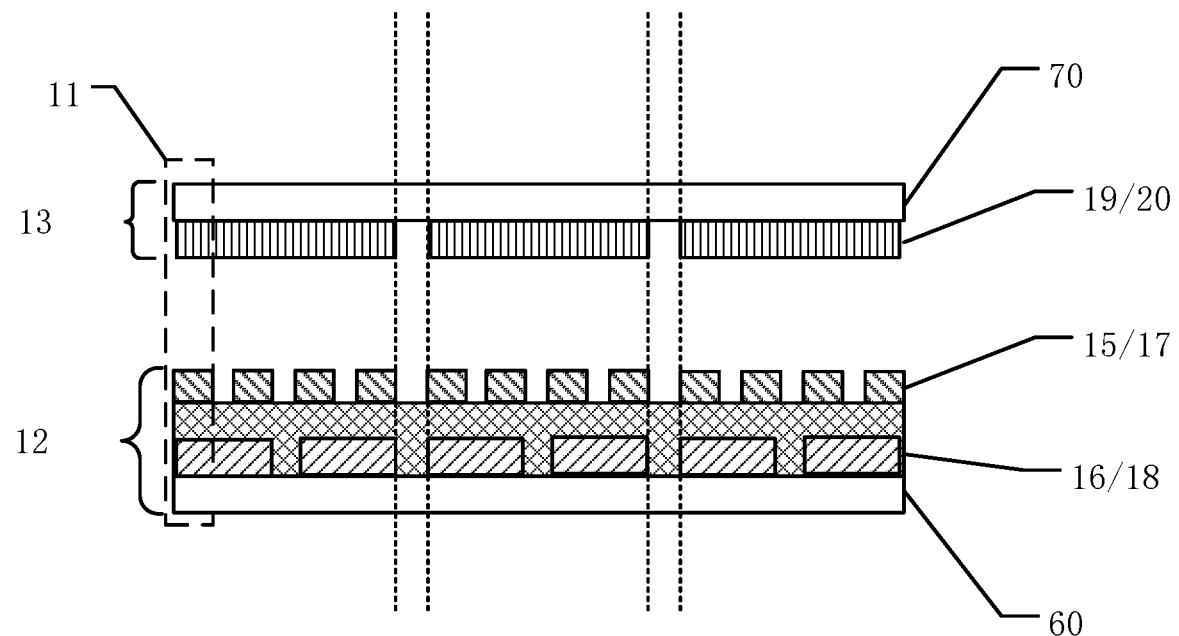
FIG. 5 illustrates a cross-sectional view of another exemplary touch-control display panel consistent with various disclosed embodiments in the present disclosure.

In various embodiments, the first electrodes 18 and the touch-control electrodes 20 may overlap with each other in different forms. Each touch-control electrode 20 may correspond to at least one first electrode 18. In detail, each touch-control electrode 20 may correspond to one, two or more first electrodes 18. In one embodiment, each touch-control electrode 20 may correspond to two first electrodes 18. FIG. 5 illustrates a cross-sectional view of another touch-control display panel consistent with various embodiments of the present disclosure. Along the direction perpendicular to the touch-control display panel 10, each touch-control electrode 20 may overlap with two first electrodes 18, and may be electrically connected to two first electrodes 18 overlapped with this touch-control electrode 20. The overlap between the touch-control electrodes 20 and the first electrodes 18 in FIG. 5 is for example only, and there is no limitation on the overlap between the touch-control electrodes 20 and the first electrodes 18.

In various embodiments provided by the present disclosure, the touch-control electrodes 20 may be integrated into the touch-control display panel 10. For example, the touch-control electrode layer 19 may be deployed on a side of the second substrate 13 close to the first substrate 12, and the first electrode layer 16 may be deployed on a side of the first substrate 12 close to the second substrate 13. The touch-control electrode layer 19 may include a plurality of touch-control electrodes 20, and the first electrode layer 16 may include a plurality of first electrodes 18. Along the direction perpendicular to a surface of the touch-control display panel 10, each touch-control electrode 20 may overlap with one first electrode 18 at most, and may be electrically connected to the first electrode 18 overlapped with the touch-control electrode 20. In some embodiments of the present disclosure, the touch-control electrode layer 16 may be deployed on a side of the second substrate 13 close to the first substrate 12, the transmission rate of the touch-control display panel 10 may be improved. Further, the first electrode layer 16 may be electrically connected to the touch-control electrode layer 19. A coupling capacitance between the first electrode layer 16 and the touch-control electrode layer 19 may be avoided, and an interference of the coupling capacitance with the touch-control electrode layer 19 may be reduced or eliminated. Correspondingly, an accuracy of the touch-control signals and a touch-control performance of the touch-control display panel may be improved. Also, compared to the current technology, because the first electrode layer 16 may be electrically connected to the touch-control electrode layer 19, touch-control wires in the second substrate 13 may be avoided. Loads of the touch-control wires may be reduced and the touch-control performance may be improved. The first electrode layer 16 may also increase a memory capacitance of the touch-control display panel to increase an amount of charges of the pixel electrodes. A maintenance of the potential and a display quality of the touch-control display panel may be improved.

In various embodiments of the present disclosure, as illustrated in FIGS. 2-3, along the direction perpendicular to the touch-control display panel 10, the touch-control electrodes 20 and the first electrodes 18 may be arranged in a one-to-one correspondence. Each touch-control electrode 20 may overlap with one first electrode 18 along the direction perpendicular to the touch-control display panel 10. Further, each touch-control electrode 20 and the first electrode 18 overlapped with the touch-control electrode 20 may have the same shape and the same size.

In one embodiment, a quantity of the touch-control electrodes 20 may be equal to a quantity of the first electrodes 18, and the touch-control electrodes 20 and the first electrodes 18 may have an approximately same shape and size. Further, an orthographic projection of the touch-control electrodes 20 and of the first electrodes 18 may completely overlap. Correspondingly, the signal and a charge time of the touch-control electrodes 20 and of the first electrodes 18 may be as consistent as possible, and the coupling capacitance between the touch-control electrodes 20 and the first electrodes 18 may be reduced or eliminated. The influence of the coupling capacitance on the touch-control performance of the touch-control display panel 10 may be reduced. The approximate same may refer to the same in a range of a process error. For example, if the size difference between the touch-control electrodes 20 and the first electrodes 18 is in the range of the process error, the touch-control electrodes 20 and the first electrodes 18 may be considered having a same size. In various embodiments, the touch-control electrodes 20 and the first electrodes 18 may have a completely same shape and size when not considering the process error.

As illustrated in FIG. 3, a first slot 181 between adjacent first electrodes 18 may not overlap with the pixel electrodes 17. Also, a second slot 201 between adjacent touch-control electrodes 20 may not overlap with the pixel electrodes 17. In detail, a first slot 181 between adjacent first electrodes may be located between adjacent pixel electrodes 17, and a second slot 201 between adjacent touch-control electrodes 20 may be located between adjacent pixel electrodes 17. Correspondingly, the first slots 181 and the second slots 201 may not overlap with the pixel electrodes 17. The first electrodes 18 and the touch-control electrodes 20 may not only cover a portion of the pixel electrodes 17. An influence on the display performance of the pixel electrodes 17 may be avoided.

In various embodiments, as illustrated in FIGS. 2-3, the touch-control electrodes 20 may be also used as common electrodes. In one embodiment, the touch-control display panel may use a time-sharing multiplexing technology. When the touch-control display panel is in a display stage, the touch-control electrode layer 19 may be also used as a common electrode layer. The touch-control electrode layer 19 may provide a common voltage signal for the touch-control electrode 20 and the first electrode 18 connected to the touch-control electrode 20, and provide a data signal for the pixel electrode 17. The touch-control display panel 10 may display image information. When the touch-control display panel 10 is in a touch-control stage, the touch-control electrode layer 19 may be used as a touch-control layer, to provide a touch-control signal for the touch-control electrode 20 and the first electrode 18 connected to the touch-control electrode 20. The touch-control electrode layer 19 may sense the touch-control operation information. Correspondingly, it may become unnecessary to deploy the common electrodes on the second substrate 13, and a thickness of the touch-control display panel may be reduced. A thinner and lighter touch-control display panel may be achieved. Further, the transmission rate of the touch-control display panel may be improved because an electrode layer is avoided. The touch-control electrodes and the common electrodes are electrically connected. When the common electrodes switch from the common voltage signals to the touch-control signals, voltage changes in the common electrodes and voltage changes in the touch-control electrodes may be same. An influence of the voltage changes in the common electrodes and an influence of the voltage changes in the touch-control electrodes on the pixel electrodes may cancel each other. Then the common electrode layer may not interfere with the signals in the pixel electrodes when the common electrode layer switches from the common voltage in the display stage to the touch-control signal voltage. Since the touch-control electrodes may be connected to the first electrodes, the touch-control display panel may only need a flexible circuit board, and the cost of the touch-control display panel may be reduced.

Figure 6:
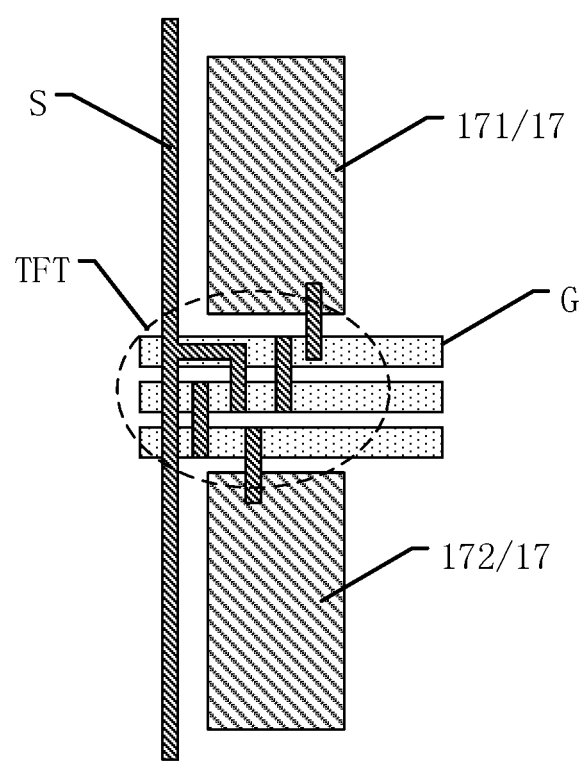
FIG. 6 illustrates a structure of an exemplary pixel consistent with various disclosed embodiments in the present disclosure.

In various embodiments, the touch-control display panel may be a twisted-nematic-type (TN-type) display panel. In one embodiment, as illustrated in FIG. 6, the touch-control display panel may be a fully reflective display panel. FIG. 6 illustrates a structure of a pixel. For description purposes, FIG. 6 only shows a part of the pixel. A pixel electrode 17 may include a first sub-electrode 171 and a second sub-electrode 172. Gate lines G may be located between the first sub-electrode 171 and the second sub-electrode 172. Data lines S may be connected to the first sub-electrode 171 and the second sub-electrode 172 through a plurality of thin film transistors TFT, respectively. The pixel electrode 17 may be a reflective electrode and may reflect ambient lights outside the touch-control display panel. The touch-control display panel including pixels illustrated in FIG. 6 may be driven with a low frequency, and an effective display time within one frame may be relatively long so that a touch-control delay time is relatively small. Visible cutting slots in the touch-control electrodes may be avoided.

Figure 7:
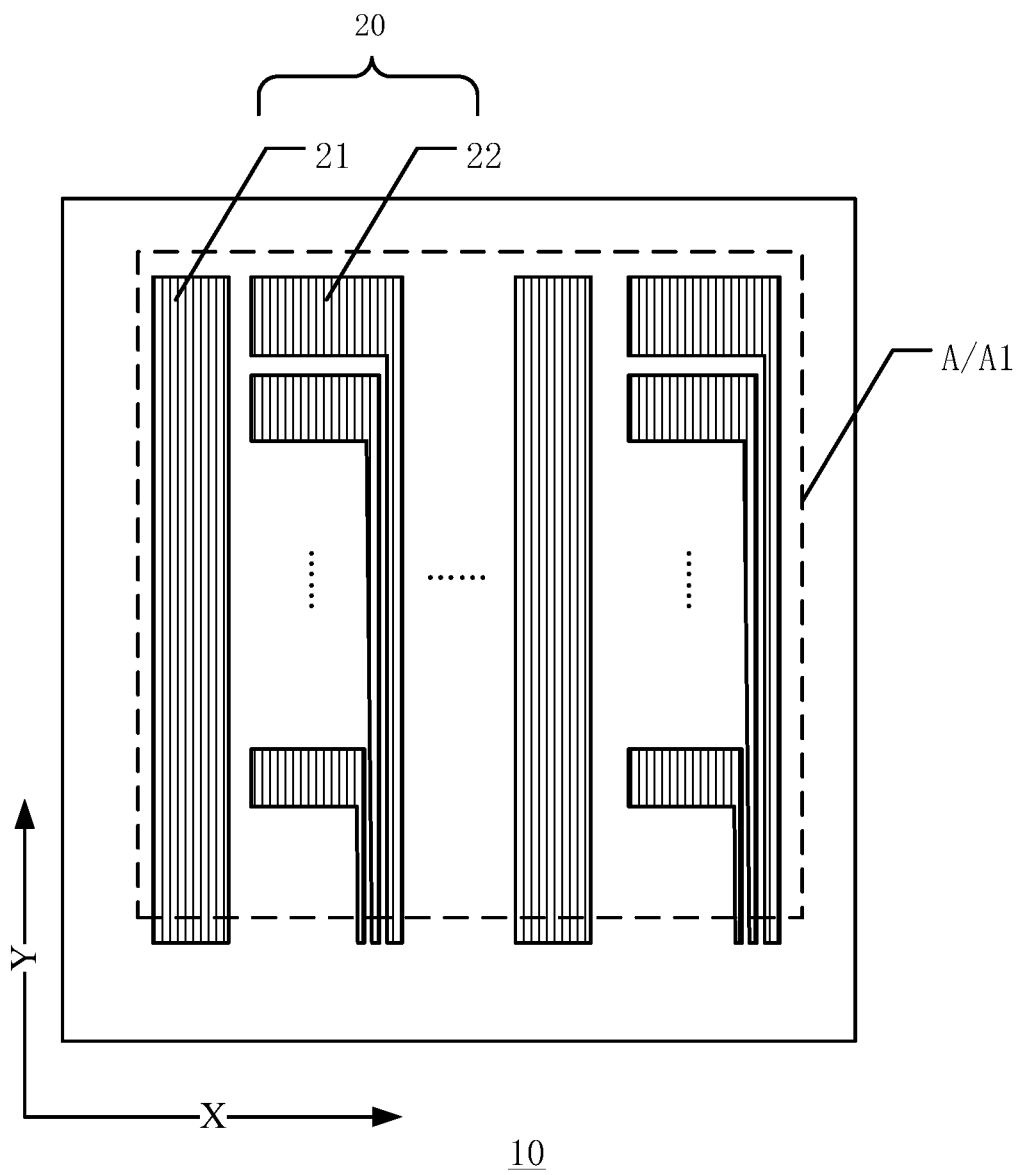
FIG. 7 illustrates a structure of a first substrate in another exemplary touch-control display panel consistent with various disclosed embodiments in the present disclosure.

FIG. 7 illustrates a structure of the first substrate of a touch-control display panel consistent with various embodiments of the present disclosure. A plurality of the touch-control electrode 20 may include touch-control emitting electrodes 21 and touch-control receiving electrodes 22. When applying an appropriate voltages on the touch-control emitting electrode 21 and the touch-control receiving electrode 22 respectively, a coupling capacitance may appear between a touch-control emitting electrode 21 and the corresponding touch-control receiving electrode 22 and may be used to monitor touch-control operations. When a touch-control operation happens on the touch-control display panel, the coupling capacitance at the corresponding position in the touch-control display panel may be disturbed, inducing a change of the electrical signals in the touch-control receiving electrode at the corresponding position in the touch-control display panel. Correspondingly, a position information of the touch-control operation may be retrieved by calculating/analyzing the change of the electrical signal in the touch-control receiving electrode.

In one embodiment, as illustrated in FIG. 7, the touch-control emitting electrode 21 may have a long-strip shape extending along a first direction Y, and the touch-control receiving electrode 22 may have a block shape. In other embodiments, the touch-control receiving electrode 22 may have any other appropriate shape (such as a diamond shape). A plurality of the touch-control receiving electrodes 22 may be arranged along the first direction Y to form a column of touch-control receiving electrodes. The touch-control emitting electrodes 21 and the columns of touch-control receiving electrodes may be arranged alternately along a second direction X. Along the second direction X, a column of the touch-control emitting electrodes 21 may be deployed followed by a column of the touch-control receiving electrodes 22, and so on. The first direction X and the second direction Y may intersect with each other.

FIG. 7 only shows one shape and one arrangement of the touch-control emitting electrodes and the touch-control receiving electrodes, for description purposes. There is no limitation on the shape and arrangement of the touch-control emitting electrodes and the touch-control receiving electrodes in the present disclosure. There may be a plurality of shapes and arrangement of the touch-control emitting electrodes and the touch-control receiving electrodes.

Figure 8:
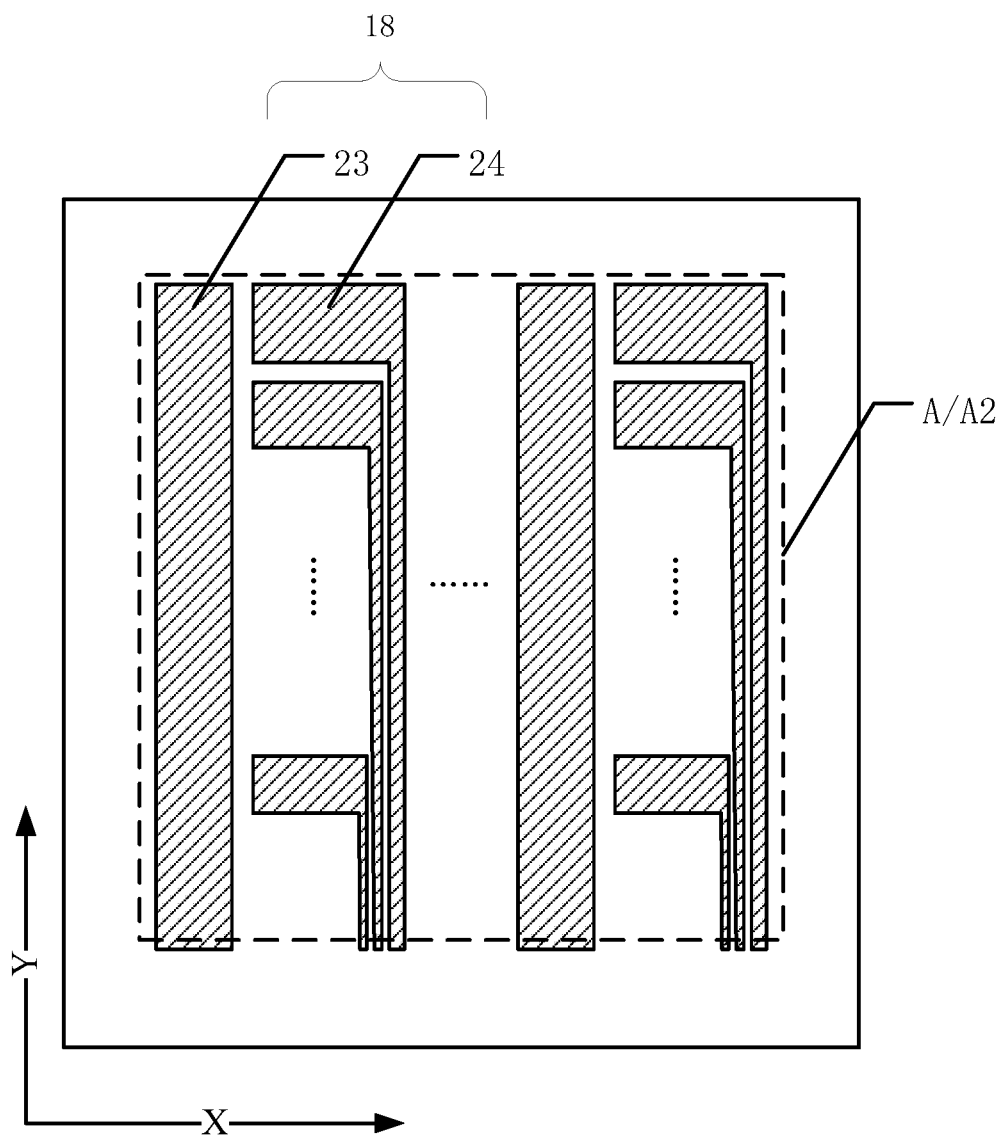
FIG. 8 illustrates a structure of a second substrate in another exemplary touch-control display panel consistent with various disclosed embodiments in the present disclosure.

FIG. 8 illustrates a structure of the second substrate of a touch-control display panel consistent with various embodiments of the present disclosure. The first electrodes 18 may include first A-electrodes 23 and first B-electrodes 24. A first A-electrode 23 may have a shape and a size same as the touch-control emitting electrode 21, and a first B-electrode 24 may have a shape and a size same as the touch-control receiving electrode 22. Correspondingly, an electrical signal and a charge time for a first A-electrode 23 and for the corresponding touch-control emitting electrode 21, an electrical signal and a charge time for a first B-electrode 24 and for the corresponding touch-control receiving electrode 22 may be kept consistent as much as possible. A coupling capacitance between the first A-electrode 23 and the corresponding touch-control emitting electrode 21, and a coupling capacitance between the first B-electrode 24 and the corresponding touch-control receiving electrode 22 may be avoided. The coupling capacitance between the first A-electrode 23 and the corresponding touch-control emitting electrode 21 may affect the touch-control signals in the touch-control emitting electrode 21, and the coupling capacitance between the first B-electrode 24 and the corresponding touch-control receiving electrode 22 may affect the touch-control signal in the touch-control receiving electrode 21, inducing a poor display performance of the touch-control display panel.

Various methods may be used for connecting a first electrode with one touch-control electrode overlapped with the first electrode, according to various embodiments of the present disclosure.

Figure 9:
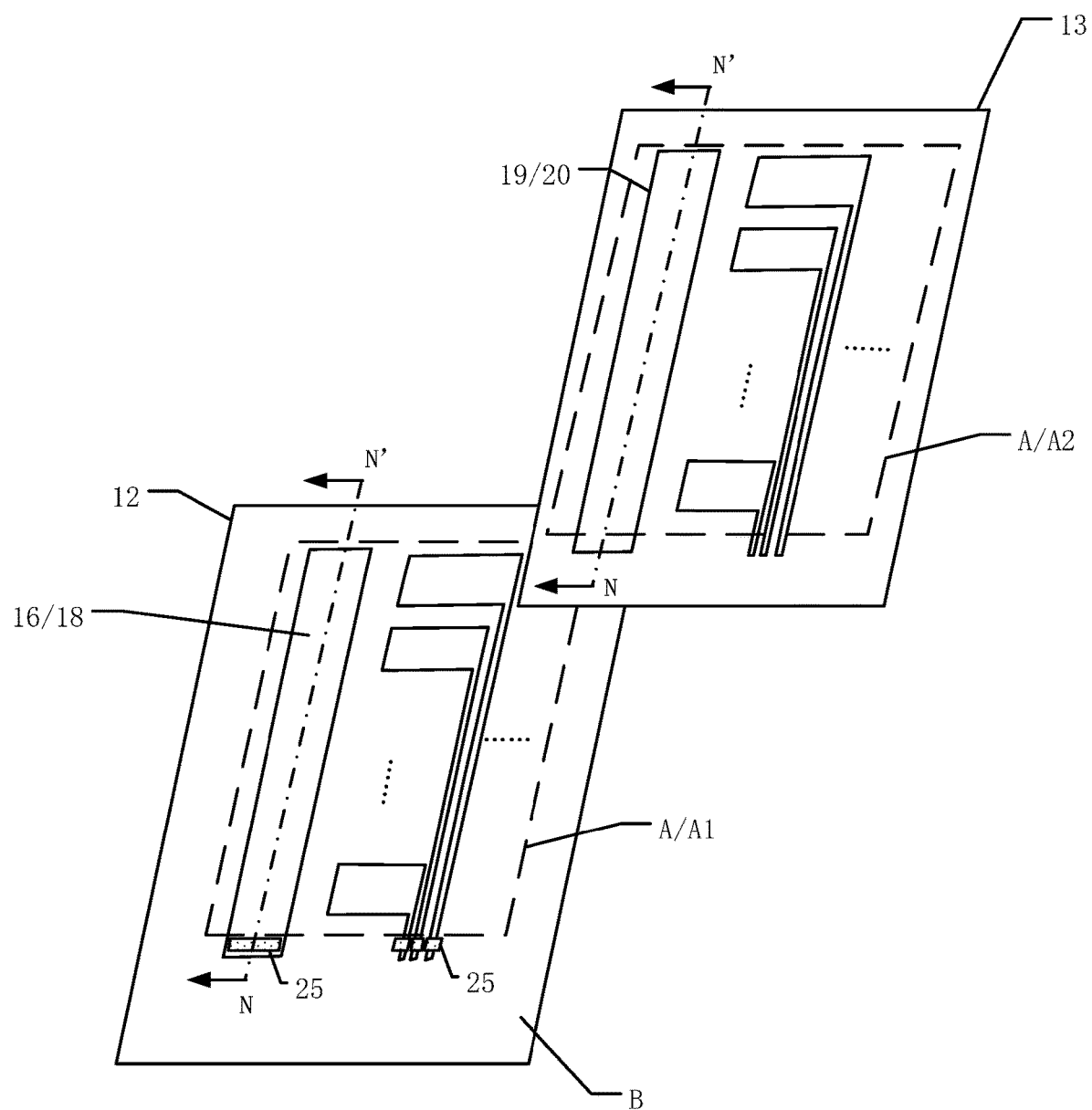
FIG. 9 illustrates a structure of another exemplary touch-control display panel consistent with various disclosed embodiments in the present disclosure.
Figure 10:
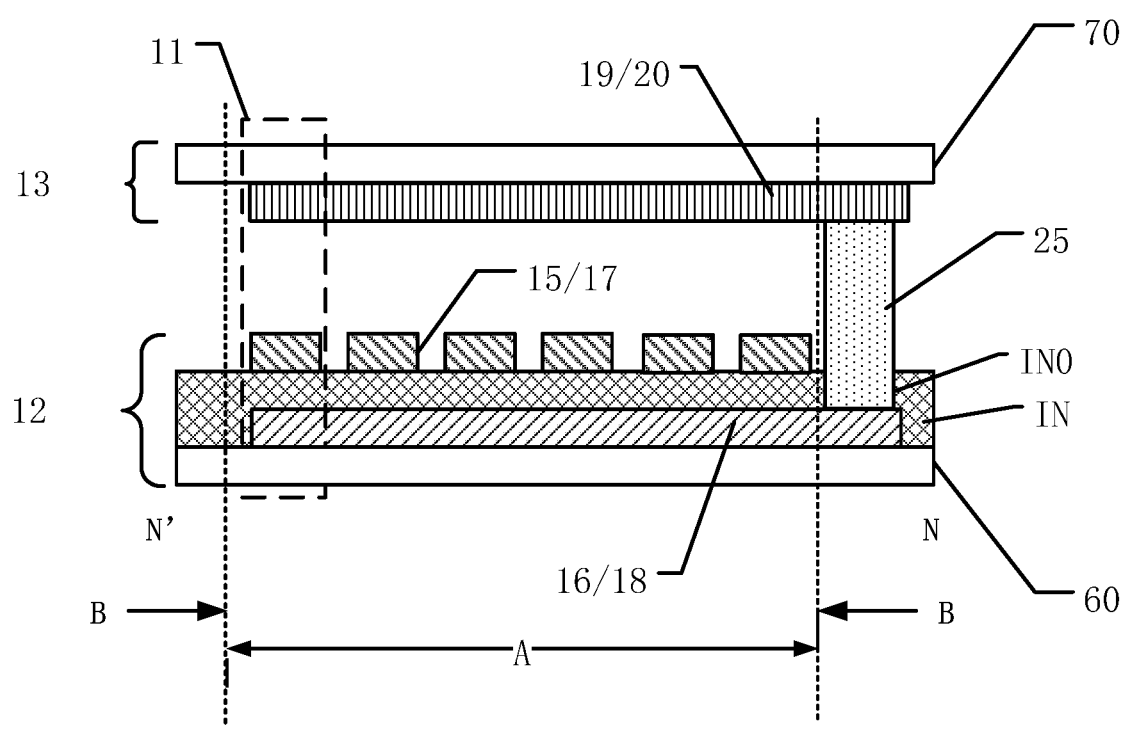
FIG. 10 illustrates a cross-sectional view along the N-N' direction of the touch-control display panel in FIG. 9, consistent with various disclosed embodiments in the present disclosure.

FIG. 9 illustrates a splitting structure of another touch-control display panel consistent with the present disclosure, and FIG. 10 illustrates a cross-sectional view of the touch-control display panel in FIG. 9 along N-N' wires in FIG. 9. Although there are two N-N' wires in FIG. 9, the two substrates are overlapped with each other in the real touch-control display panel and the two N-N' wires in FIG. 9 form one wire actually. A non-display area B may include a plurality of conductive parts 25. The conductive parts 25 may be deployed between the first substrate 12 and the second substrate 13. Each first electrode 18 and the touch-control electrode 20 overlapped with the first electrode 18 may both extend into the non-display area B, and may be connected to each other through a conductive part 25. Since each first electrode 18 and the touch-control electrode 20 overlapped with the first electrode 18 may be deployed on two substrates respectively, a conductive part 25 may electrically connect the first electrode 18 to the touch-control electrode 20 overlapped with the first electrode 18. The structure and process may be simplified and easy to be performed.

The conductive parts 25 may be made of a material including an anisotropic conductive adhesive. The anisotropic conductive adhesive may only conduct along a direction perpendicular to the touch-control display panel 10. The anisotropic conductive adhesive may have a large resistance along other directions or be insulating along other directions, to avoid short between two adjacent conductive parts 25.

The shape of the conductive parts 25 in FIGS. 9-10 is for example only. There is no limitation on the shape of the conductive parts 25. The shape of the conductive parts 25 can be determined according to the requirements of the realistic process.

Figure 11:
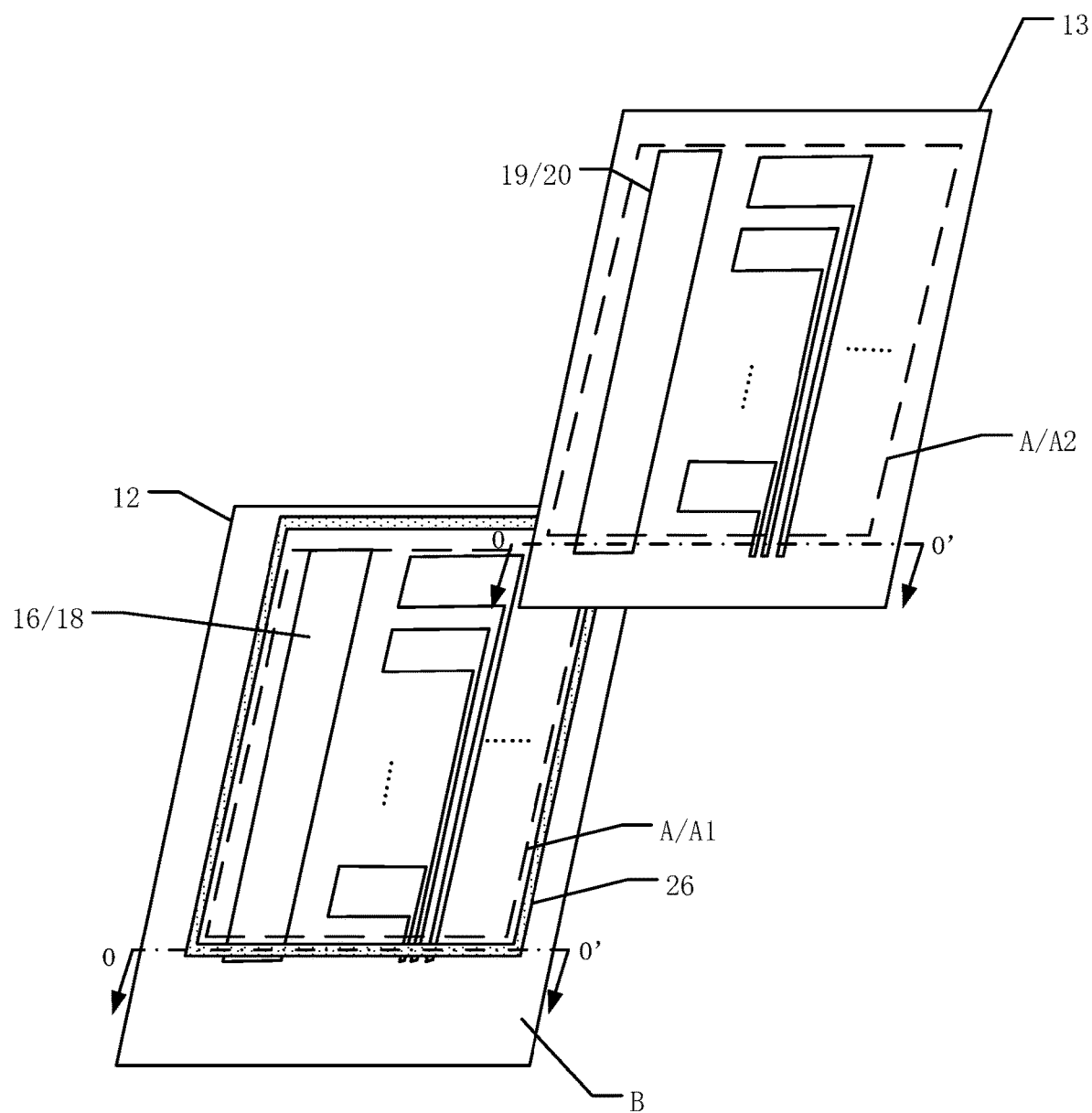
FIG. 11 illustrates a structure of another touch-control display panel consistent with disclosed embodiments.
Figure 12:
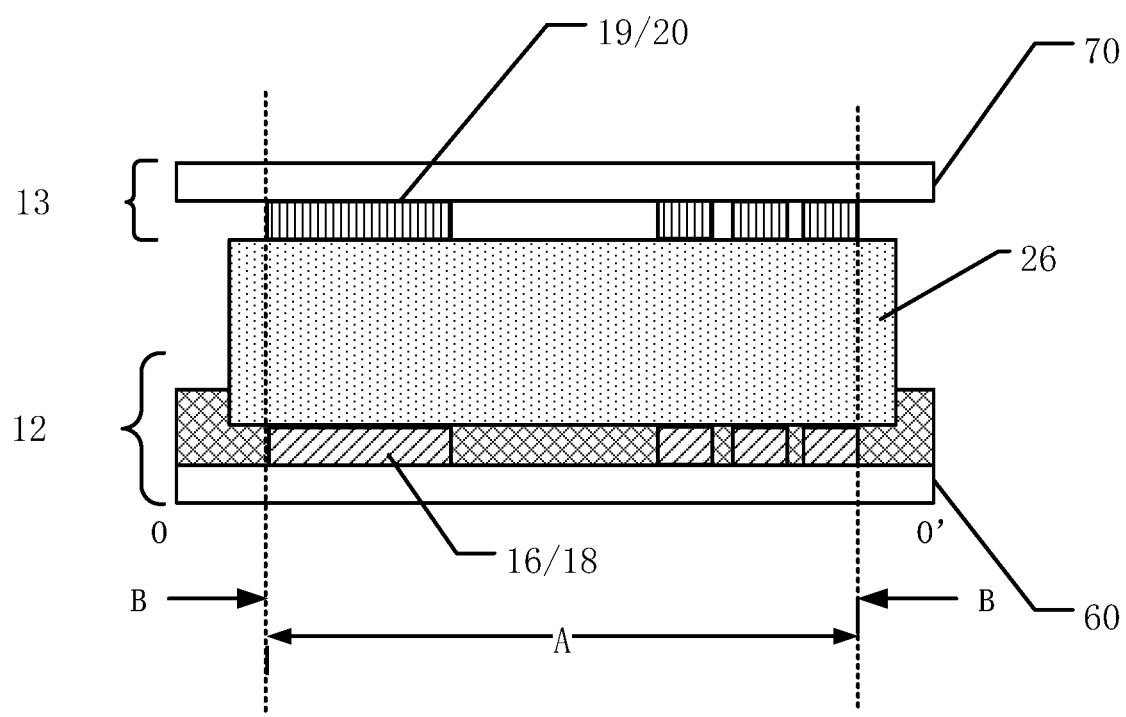
FIG. 12 illustrates a cross-sectional view along the O-O' direction of the touch-control display panel in FIG. 11, consistent with various disclosed embodiments in the present disclosure.

FIG. 11 illustrates a splitting structure of another touch-control display panel consistent with the present disclosure, and FIG. 12 illustrates a cross-sectional view of the touch-control display panel in FIG. 11 along O-O' wires in FIG. 11. Although there are two O-O' wires in FIG. 11, the two substrates are overlap with each other in the real touch-control display panel and the two O-O' wires in FIG. 11 form one wire actually. The non-display area B may include a frame adhesive 26 surrounding the display area A. The frame adhesive may be deployed between the first substrate 12 and the second substrate 13. The first substrate 12 and the second substrate 13 may be attached to each other through the frame adhesive 26. The frame adhesive may be made of a material including an anisotropic conductive adhesive, and may be used as the conductive parts 25 at the same time.

The conductive parts 25 and the frame adhesive 26 may be used to connect each first electrode to the touch-control electrode overlapped with the first electrode. Correspondingly, the coupling capacitance between the first electrode layer 16 and the touch-control electrode layer 19 may be reduced, and the accuracy of the touch-control signals may be improved, to improve the touch-control performance of the touch-control display panel.

In some embodiments, the touch-control display panel may further include an electrode insulating layer IN between the first electrode layer 16 and the pixel electrode layer 15, as illustrated in FIG. 10. The electrode insulating layer IN may include contact holes IN0. The contact holes IN0 may pass through the electrode insulating layer IN along a width direction of the electrode insulating layer IN. Each contact hole IN0 may overlap with one first electrode 18 along a direction perpendicular to the touch-control display panel. Each conductive part 25 may fill in a contact hole IN0. In these embodiments, the first electrode layer 16 and the pixel electrode layer 15 may be insulated from each other by the electrode insulating layer IN between the first electrode layer 16 and the pixel electrode layer 15. To connect each first electrode 18 to the touch-control electrode 20 overlapped with the first electrode 18, the electrode insulating layer IN may include the contact holes IN0, to expose a portion of a side surface of each first electrode 18 close to the second substrate. Each conductive part 25 in the contact hole IN0 may directly contact a first electrode 18, and each touch-control electrode 20 may directly contact a contact hole 25. Correspondingly, each first electrode 18 may be connected to the touch-control electrode 20 overlapped with the first electrode 18.

Figure 13:
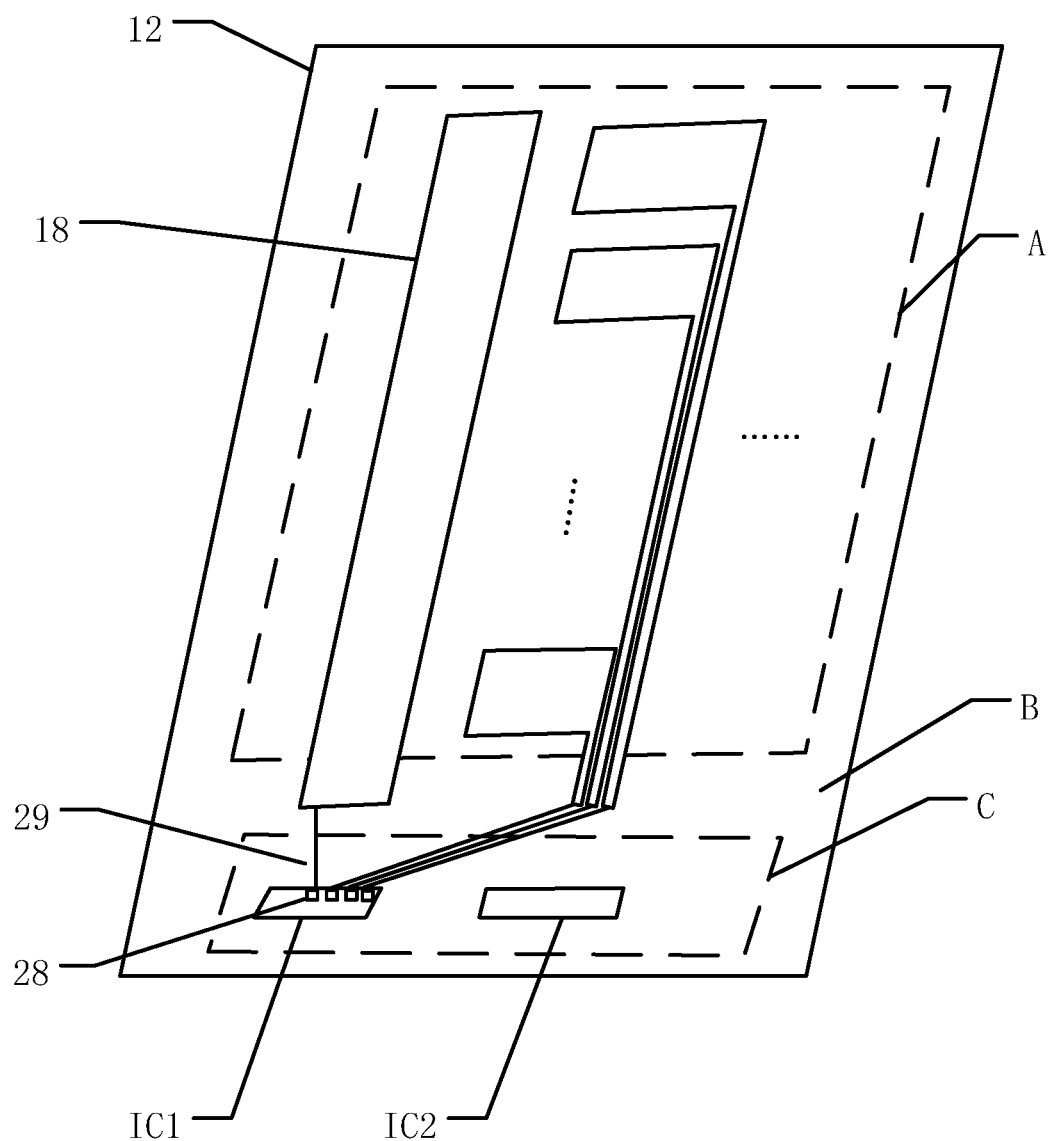
FIG. 13 illustrates a planar view of a first substrate in another exemplary touch-control display panel consistent with various disclosed embodiments in the present disclosure.

FIG. 13 illustrates a structure of the first substrate in another touch-control display panel consistent with various embodiments of the present disclosure. The first substrate 12 may include a first bonding area C. The first bonding area C may include a plurality of conductive soldering pads 28, and may be used to bond with a flexible circuit board or an integration circuit chip. The non-display area B in the first substrate 12 may include a plurality of interconnecting wires 29. For each interconnecting wire 29, an end may be electrically connected to a first electrode 18, and another end may be electrically connected to a conductive soldering pad 28. The interconnecting wires 29 may transmit electrical signals to the first electrodes 18. Optionally, the interconnecting wires 29 may be made of a metal material. Optionally, the interconnecting wires 29 may be deployed in a same layer with the gate wires or data wires in the touch-control display panel 10. There is no limitation on the location of the interconnecting wires 29 in the present disclosure.

Optionally, as illustrated in FIG. 13, a touch-control control chip IC1 and a driving chip IC2 may be bonded in the first bonding area C, and the touch-control chip IC1 and the driving chip IC2 may be connected to the corresponding conductive soldering pads by a conductive adhesive. The touch-control chip IC1 may transmit touch-control signals to the first electrodes 18 through the interconnecting wires 29. The driving chip IC2 may transmit electrical signals to other circuits in the touch-control display panel 10.

Figure 14:
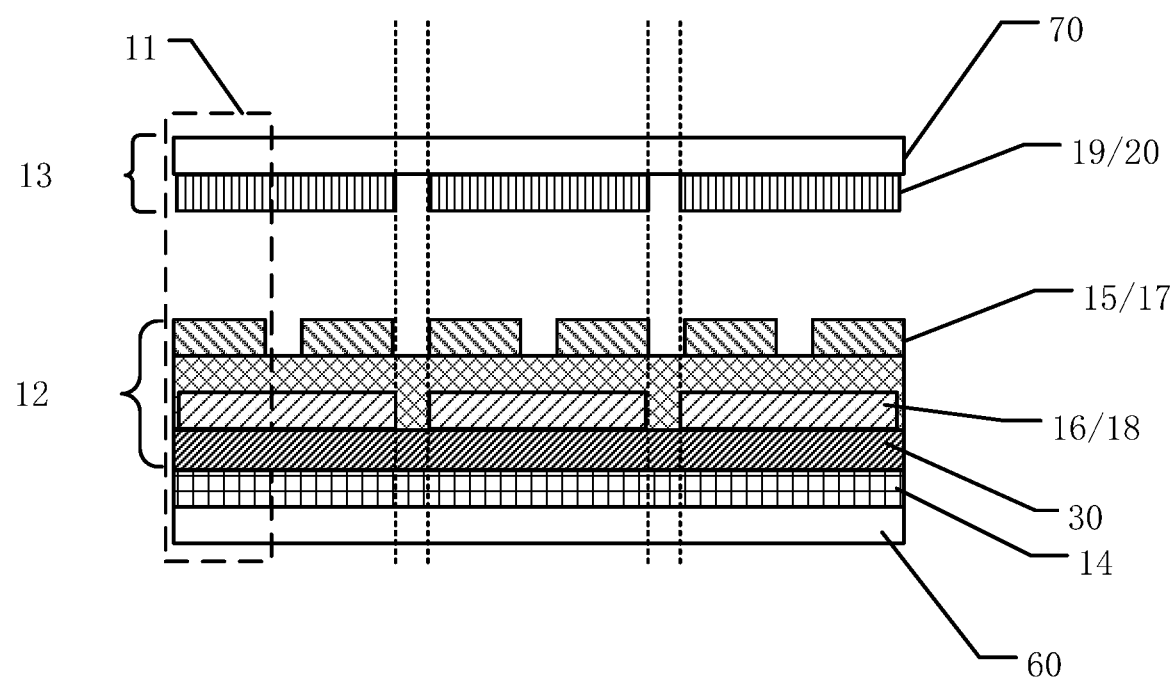
FIG. 14 illustrates a cross-sectional view of an exemplary touch-control display device consistent with various disclosed embodiments in the present disclosure.

FIG. 14 illustrates a cross-sectional view of another touch-control display device consistent with various embodiments of the present disclosure. The first electrode layer 16 may be deployed on one side of the array of the thin film transistors 14 away from the first substrate 13. An insulating layer 30 may be deployed between the first electrode layer 16 and the array of the thin film transistors 14. The insulating layer 30 may have a thickness of about 0.1 µm to about 4 µm. Optionally, the insulating layer 30 may have a thickness of about 1 µm to about 4 µm. A thick insulating layer 30 may increase a distance between the first electrode layer 16 and the array of the thin film transistors 14, reduce an interference and a coupling capacitance between the first electrode layer 16 and the array of the thin film transistors 14. Correspondingly, an accuracy of signals in the first electrode layer 16 and the array of the thin film transistors 14, as well as the display performance of the touch-control display panel, may be improved. The insulating layer 30 may be made of an organic material or an inorganic material, and there is no limitation on the material of the insulating layer 30. When the insulating layer is made of an organic material, the process is simple. Optionally, the insulating layer 30 may be made of an organic material by a coating process. The coating process may easily form a thick insulating layer 30 and the thickness of the insulating layer 30 may be about 1 μm to about 4 μm. When the insulating layer 30 is made of an inorganic material by a vapor deposition process, it may be hard to form the insulating layer 30 with the thickness of about 1 μm to about 4 μm. In the present technology, the insulating layer 30 made of an inorganic material may have a thickness below 1 μm, such as about 300 Å to about 600 Å.

As illustrated in FIG. 14, the touch-control electrodes 20 may be made of a material including indium oxide, zinc oxide, tin oxide, gallium oxide, or a combination thereof. The first electrodes 18 may be made of a material including indium oxide, zinc oxide, tin oxide, gallium oxide, or a combination thereof. These metal oxide films are transparent, conductive, and can block electronic radiations harmful to humans.

Figure 15:
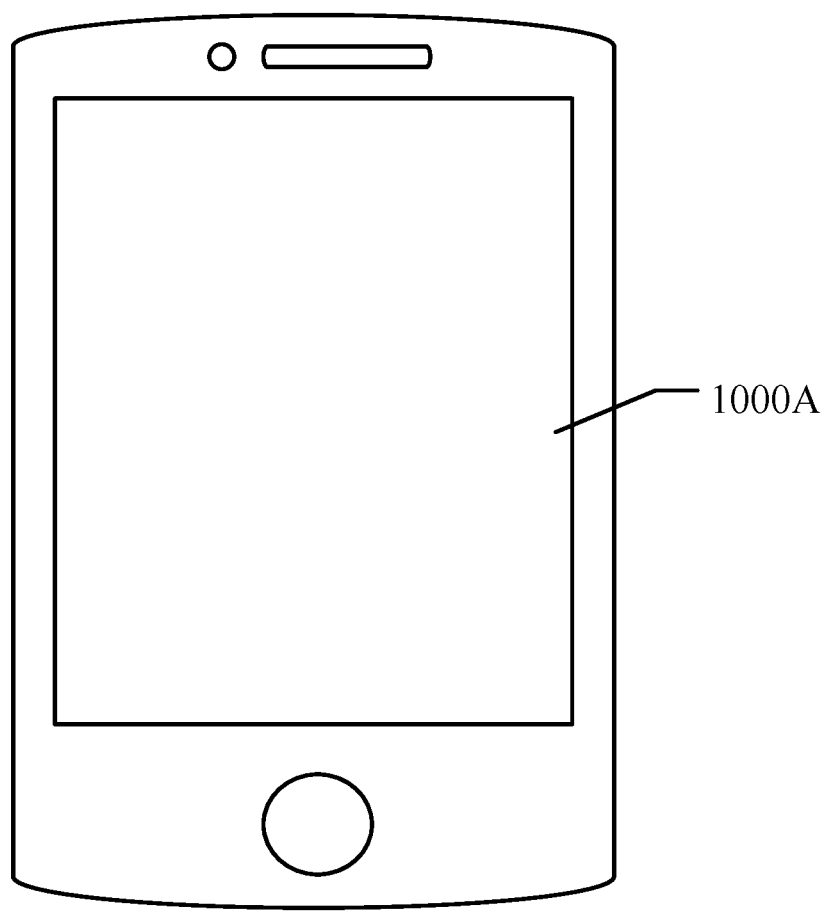
FIG. 15 illustrates a planar view of another exemplary touch-control display device consistent with various disclosed embodiments in the present disclosure.

The present disclosure also may provide a touch-control display device including any touch-control display panel consistent with previous embodiments of the present disclosure. FIG. 15 illustrates a structure of a touch-control display device consistent with various embodiments of the present disclosure. The touch-control display device 1000 in FIG. 15 may include any touch-control display panel 1000A provided by various embodiments of the present disclosure. In FIG. 15, the present disclosure is described by using a cell phone as an example for description purposes, and there is no limitation on the touch-control display device. In various embodiments, the touch-control display device provided by various embodiments of the present disclosure may be any touch-control display device such as a computer, a television, a vehicle display device. The touch-control display device provided by various embodiments of the present disclosure may have all advantages of the touch-control display panel provided by the various embodiments of the present disclosure.

The present disclosure also provides a driving method for a touch-control display panel 10 consistent with the various embodiments of the present disclosure. As illustrated in FIGS. 2-3, the touch-control display panel 10 may include a display area A and a non-display area B. The display area A may include a plurality of pixels 11, and a first substrate 12 and a second substrate 13 configured opposing each other. A display area A1 in the first substrate 12 may include a pixel electrode layer 15 and a first electrode layer 16. The first electrode layer 16 may be deployed on a side of the pixel electrode layer 15 away from the second substrate 13. The pixel electrode layer 15 may include a plurality of pixel electrodes 17 and the first electrode layer 16 may include a plurality of first electrodes 18. A touch-control electrode layer 19 may be deployed on a side of the non-display area A2 in the second substrate 13 close to the first substrate 12. The touch-control electrode layer 19 may include a plurality of touch-control electrodes 20. Along a direction perpendicular to the touch-control display panel 10, each first electrode 18 may overlap with at most one touch-control electrode 20, and may be connected to the touch-control electrode 20 overlapped with the first electrode 18.

Figure 16:
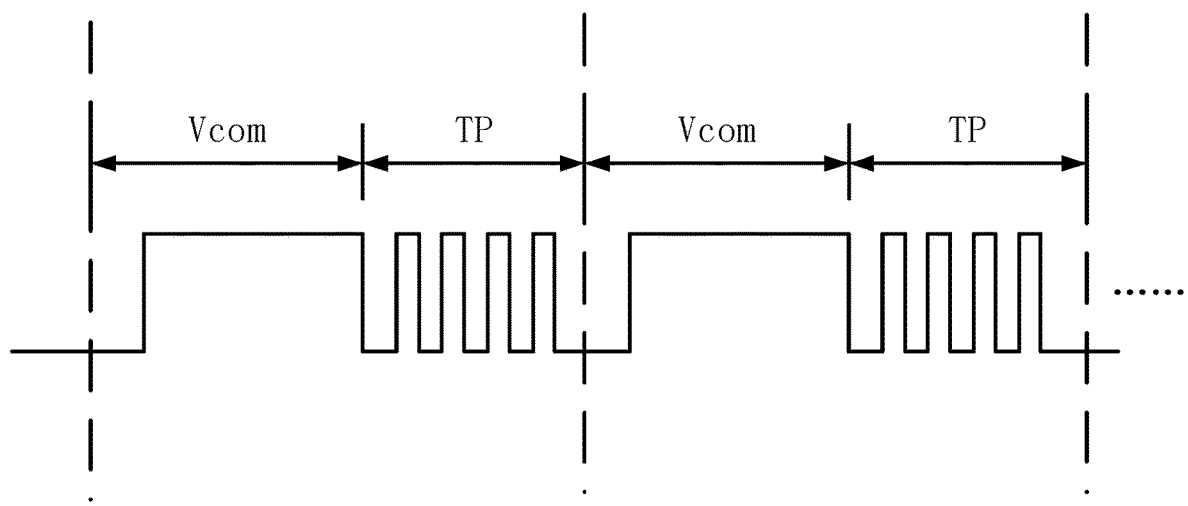
FIG. 16 illustrates a time sequence diagram of touch-control electrodes of another touch-control display device consistent with various disclosed embodiments in the present disclosure.

FIG. 16 illustrates a time sequence diagram of touch-control electrodes of another touch-control display device consistent with disclosed embodiments. A driving method provided by various embodiments of the present disclosure may include: in a display stage of the touch-control display panel 10, achieving display function by providing a common voltage signal Vcom to the touch-control electrode 20 and the first electrode 18 that is electrically connected to the touch-control electrode 20, and by providing a data signal to the pixel electrode 17; in a touch-control stage of the touch-control display panel 10, achieving touch-control functions by providing a touch-control signals TP to the touch-control electrode 20 and the first electrode 18 that is electrically connected to the touch-control electrode 20. A time-dividing multiplexing method may be used in the driving method provided by the present disclosure. In a display stage of the touch-control display panel 10, the touch-control electrode layer 19 may be used as the common electrode layer to provide the common voltage signal Vcom to the touch-control electrode 20 and the first electrode 18 that is electrically connected to the touch-control electrode 20, and to provide the data signal to the pixel electrode 17. The touch-control display panel 10 may display image information accordingly. In a touch-control stage of the touch-control display panel 10, the touch-control electrode layer 19 may be used as the touch-control layer, to provide the touch-control signal TP to the touch-control electrode 20 and the first electrode 18 that is electrically connected to the touch-control electrode 20. The touch-control electrode layer 19 may detect the information of the touch-control operations.

In various embodiments, the common voltage signal Vcom may include one of a DC signal and an AC signal with a frequency lower than 60 Hz. A lower frequency of the AC signal may be beneficial for increasing charge times of the gate lines. When a number of the gate lines is a constant, increasing a charge time of each gate line may guarantee that every pixel has enough time to charge and may improve a display quality. When a number of the gate lines and the charge time of each gate line are constant, the AC signal with a low frequency may increase a time in the touch-control stage and increase a charge time for the touch-control electrode. The touch-control performance may be improved.

In the present disclosure, the touch-control electrodes may be deployed in the touch-control display panel. In some embodiments, the touch-control electrode layer may be deployed on a side of the color film substrate close to the array substrate, and the memory electrode layer may be deployed on a side of the array substrate close to the color film substrate. The touch-control electrode layer may include a plurality of the touch-control electrodes, and the memory electrode layer may include a plurality of the memory electrodes. Along the direction perpendicular to the touch-control display panel, each touch-control electrode may overlap with at most one memory electrode, and may be electrically connected to the memory electrode overlapped with the touch-control electrode. By deploying the touch-control electrode layer on a side of the color film substrate close to the array substrate, loads of the touch-control wires may be reduced. The touch-control performance may be improved and the transmission rate of the touch-control display panel may be increased simultaneously. Further, the memory electrode layer may be electrically connected to the touch-control electrode layer, coupling capacitances between the memory electrode layer and the touch-control electrode layer may be reduced or avoided. Correspondingly, an influence of the coupling capacitances on the touch-control electrode layer may be reduced or avoided. The accuracy of the touch-control signals and the touch-control performance of the touch-control display panel may be improved. Moreover, the first electrode layer may be used to increase the memory capacitances of the touch-control display panel and the charge amounts of the pixel electrodes. The maintenance of the electrical potential and the display performance of the touch-control display panel may be improved.

Various embodiments have been described to illustrate the operation principles and exemplary implementations. It should be understood by those skilled in the art that the present invention is not limited to the specific embodiments described herein and that various other obvious changes, rearrangements, and substitutions will occur to those skilled in the art without departing from the scope of the invention. Thus, while the present invention has been described in detail with reference to the above described embodiments, the present invention is not limited to the above described embodiments, but may be embodied in other equivalent forms without departing from the scope of the present invention, which is determined by the appended claims.

What is claimed is:

1. A touch-control display panel, comprising:
a display area including a plurality of pixels;
a non-display area;
a first substrate and a second substrate opposing the first substrate, wherein:
a portion of the first substrate in the display area includes a pixel electrode layer and a first electrode layer;
the first electrode layer is located on a side of the pixel electrode layer away from the second substrate;
the pixel electrode layer includes a plurality of pixel electrodes;
the first electrode layer includes a plurality of first electrodes;
a touch-control electrode layer is located on a side of the second substrate toward the first substrate;
the touch-control electrode layer includes a plurality of touch-control electrodes; and
along a direction perpendicular to the touch-control display panel, each touch-control electrode of the plurality of touch-control electrodes and at least one first electrode of the plurality of first electrodes are physically connected by a conductive part formed there-between in the non-display area.

2. The touch-control display panel according to claim 1, wherein:
in the direction perpendicular to the touch-control display panel, the plurality of the touch-control electrodes and the plurality of the first electrodes are arranged in a one-to-one correspondence;
one touch-control electrode of the plurality of touch-control electrodes overlaps with one first electrode of the plurality of the first electrodes in the direction perpendicular to the touch-control display panel; and
each first electrode of the plurality of the first electrodes has a size and a shape same as the touch-control electrode of the plurality of touch-control electrodes overlapped with this first electrode.

3. The touch-control display panel according to claim 1, wherein:
a first slit between adjacent first electrodes of the plurality of the first electrodes does not overlap with the corresponding pixel electrodes; and
a second slit between adjacent touch-control electrodes of the plurality of touch-control electrodes does not overlap with the corresponding pixel electrodes.

4. The touch-control display panel according to claim 1, wherein:
the plurality of the touch-control electrodes include a plurality of touch-control emitting electrodes and a plurality of touch-control receiving electrodes.

5. The touch-control display panel according to claim 4, wherein:
each touch-control emitting electrode of the plurality of touch-control emitting electrodes has a long-strip shape extending along a first direction;
each touch-control receiving electrode of the plurality of touch-control receiving electrodes has a block shape;
the plurality of the touch-control receiving electrodes are arranged along the first direction to form a column of the touch-control receiving electrodes; and
the plurality of the touch-control emitting electrodes and the columns of the touch-control receiving electrodes are arranged alternately along a second direction, wherein the second direction intersects with the first direction.

6. The touch-control display panel according to claim 5, wherein:
the plurality of the first electrodes include first A-electrodes and first B-electrodes;
each first A electrode has a shape and a size same as the corresponding touch-control emitting electrode of the plurality of touch-control emitting electrodes; and
each first B-electrode has a shape and a size same as the corresponding touch-control receiving electrode of the plurality of touch-control receiving electrodes.

7. The touch-control display panel according to claim 1, wherein:
the non-display area includes a plurality of conductive parts between the first substrate and the second substrate; and
each first electrode of the plurality of the first electrodes and the corresponding touch-control electrode of the plurality of the touch-control electrodes overlapped with the first electrode extend into the non-display area, and are electrically connected to each other through a conductive part.

8. The touch-control display panel according to claim 7, wherein the plurality of the conductive parts are made of a material including an anisotropic conductive adhesive.

9. The touch-control display panel according to claim 7, wherein:
the non-display area includes a frame adhesive surrounding the display area;
the frame adhesive is between the first substrate and the second substrate;
the first substrate and the second substrate are bonded to each other through the frame adhesive; and
the frame adhesive is made of a material including an anisotropic conductive adhesive, and is also used as the conductive part.

10. The touch-control display panel according to claim 7, further including:
an electrode insulating layer between the first electrode layer and the pixel electrode layer, wherein:
the electrode insulating layer includes a plurality of contact holes;

the plurality of the contact holes pass through the electrode insulating layer along a thickness direction of the electrode insulating layer;

along the direction perpendicular to the touch-control display panel, each contact hole of the plurality of the contact holes overlaps with one first electrode of the plurality of the first electrodes; and each conductive part of the plurality of the conductive parts fills in the corresponding of the plurality of the contact holes.

11. The touch-control display panel according to claim 1, wherein the plurality of the touch-control electrodes are also used as common electrodes.

12. The touch-control display panel according to claim 1, wherein:

the first substrate includes a first bonding area;

the first bonding area includes a plurality of conductive soldering pads and is used to bond with a flexible circuit board or an integration circuit chip;

the non-display area in the first substrate includes a plurality of interconnecting wires;

an end of each interconnecting wire of the plurality of interconnecting wires is connected to a first electrode of the plurality of the first electrodes, and another end is connected to a conductive soldering pad of the plurality of conductive soldering pads in the first bonding area.

13. The touch-control display panel according to claim 12, wherein:

the plurality of the interconnecting wires are configured in a layer same as gate wires and data wires.

14. The touch-control display panel according to claim 12, wherein:

a touch-control chip and a driving chip are bonded in the first bonding area.

15. The touch-control display panel according to claim 1, wherein:

the first electrode layer is located on a side of an array of thin film transistors away from the first substrate; and an insulating layer with a thickness of about 0.1 μm to about 4 μm is deployed between the first electrode layer and the array of the thin film transistors.

16. The touch-control display panel according to claim 15, wherein:

the insulating layer is made of an organic material or an inorganic material.

17. The touch-control display panel according to claim 1, wherein:

the plurality of the touch-control electrodes are made of a material including indium oxide, zinc oxide, tin oxide, gallium oxide, or a combination thereof; and the plurality of the first electrodes are made of a material including indium oxide, zinc oxide, tin oxide, gallium oxide, or a combination thereof.

18. A touch-control display panel, comprising:
a display area including a plurality of pixels;
a non-display area;
a first substrate; and a second substrate opposing the first substrate;

wherein:
a portion of the first substrate in the display area includes a pixel electrode layer and a first electrode layer;
the first electrode layer is located on a side of the pixel electrode layer away from the second substrate;
the pixel electrode layer includes a plurality of pixel electrodes;
the first electrode layer includes a plurality of first electrodes;
a touch-control electrode layer is located on a side of the second substrate toward the first substrate;
the touch-control electrode layer includes a plurality of touch-control electrodes;
the touch-control electrode layer includes a plurality of touch-control electrodes; and
along a direction perpendicular to the touch-control display panel, the plurality of the touch-control electrodes and the plurality of the first electrodes are overlapped in a one-to-one correspondence.

19. A driving method for a touch-control display panel, comprising:

providing the touch-control display panel, comprising:
a display area including a plurality of pixels, a non-display area, a first substrate and a second substrate, configured opposing each other, wherein:
a portion of the first substrate in the display area includes a pixel electrode layer and a first electrode layer, the first electrode layer is located on a side of the pixel electrode layer away from the second substrate, the pixel electrode layer includes a plurality of pixel electrodes, the first electrode layer includes a plurality of first electrodes, a touch-control electrode layer is located on a side of the second substrate toward the first substrate, the touch-control electrode layer includes a plurality of touch-control electrodes, the touch-control electrode layer includes a plurality of touch-control electrodes; and along a direction perpendicular to the touch-control display panel, each touch-control electrode of the plurality of touch-control electrodes and at least one first electrode of the plurality of first electrodes are connected by a conductive part formed therebetween in the non-display area;

in a display stage of the touch-control display panel,
applying a common voltage signal to the touch-control electrode and the first electrode that is electrically connected to the touch-control electrode, and
applying a data signal to the pixel electrode; and in a touch-control stage of the touch-control display panel,
applying a touch-control signal to the touch-control electrode and the first electrode that is electrically connected to the touch-control electrode.

20. The driving method according to claim 19, wherein:
the common voltage signal includes one of a DC signal and an AC signal with a frequency lower than 60 Hz.

* * * * *